US008649574B2

(12) United States Patent
Mise et al.

(10) Patent No.: US 8,649,574 B2
(45) Date of Patent: Feb. 11, 2014

(54) IMAGING APPARATUS, CONTROL METHOD OF IMAGING APPARATUS, AND COMPUTER PROGRAM

(75) Inventors: Tetsuo Mise, Tokyo (JP); Yoshito Terashima, Tokyo (JP); Hisashi Ishiwata, Kanagawa (JP); Eiji Yamaoku, Tokyo (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 13/025,226

(22) Filed: Feb. 11, 2011

(65) Prior Publication Data

US 2011/0134273 A1 Jun. 9, 2011

Related U.S. Application Data

(63) Continuation of application No. 11/756,207, filed on May 31, 2007.

(30) Foreign Application Priority Data

Jun. 9, 2006 (JP) ................................. 2006-160453

(51) Int. Cl.
*H04N 5/228* (2006.01)

(52) U.S. Cl.
USPC .................. 382/118; 348/222.1; 348/E5.031; 382/255

(58) Field of Classification Search
USPC ........................................ 348/222.1; 382/118
See application file for complete search history.

(56) References Cited

U.S. PATENT DOCUMENTS

| 5,204,715 | A * | 4/1993 | Nakanishi et al. ............... 396/82 |
| 6,049,674 | A * | 4/2000 | Yamamoto et al. ............... 396/2 |
| 6,298,198 | B1 * | 10/2001 | Ina et al. ............... 396/54 |
| 7,783,186 | B2 | 8/2010 | Ishiwata et al. |
| 2002/0154907 | A1 * | 10/2002 | Ojima ............... 396/61 |
| 2004/0207743 | A1 * | 10/2004 | Nozaki et al. ............ 348/333.12 |
| 2006/0126941 | A1 | 6/2006 | Higaki |
| 2007/0177036 | A1 * | 8/2007 | Kawada ............... 348/239 |
| 2008/0013851 | A1 | 1/2008 | Ishiwata et al. |
| 2009/0190023 | A1 | 7/2009 | Mise et al. |
| 2009/0190909 | A1 | 7/2009 | Mise et al. |

FOREIGN PATENT DOCUMENTS

| JP | 4-221944 | 8/1992 |
| JP | 6-251499 | 9/1994 |
| JP | 2001-86403 | 3/2001 |
| JP | 2002-209135 | 7/2002 |
| JP | 2004-94103 | 3/2004 |
| JP | 2004-133637 | 4/2004 |
| JP | 2004-320285 | 11/2004 |
| JP | 2005-181373 | 7/2005 |

OTHER PUBLICATIONS

Office Action issued Aug. 9, 2012 in Taiwanese Patent Application No. 096120020 (with English translation).
U.S. Appl. No. 13/607,188, filed Sep. 7, 2012, Mise, et al.

* cited by examiner

*Primary Examiner* — Brian Q Le
*Assistant Examiner* — Michael Vanchy, Jr.
(74) *Attorney, Agent, or Firm* — Oblon, Spivak, McClelland, Maier & Neustadt, L.L.P.

(57) ABSTRACT

An imaging apparatus includes a face detecting unit detecting a face region from an input image input to the imaging apparatus and a control unit calculating a distance to a subject on the basis of the face size detected by the face detection unit and displaying distance identification information indicating a distance corresponding to the calculated distance in a display unit.

13 Claims, 15 Drawing Sheets

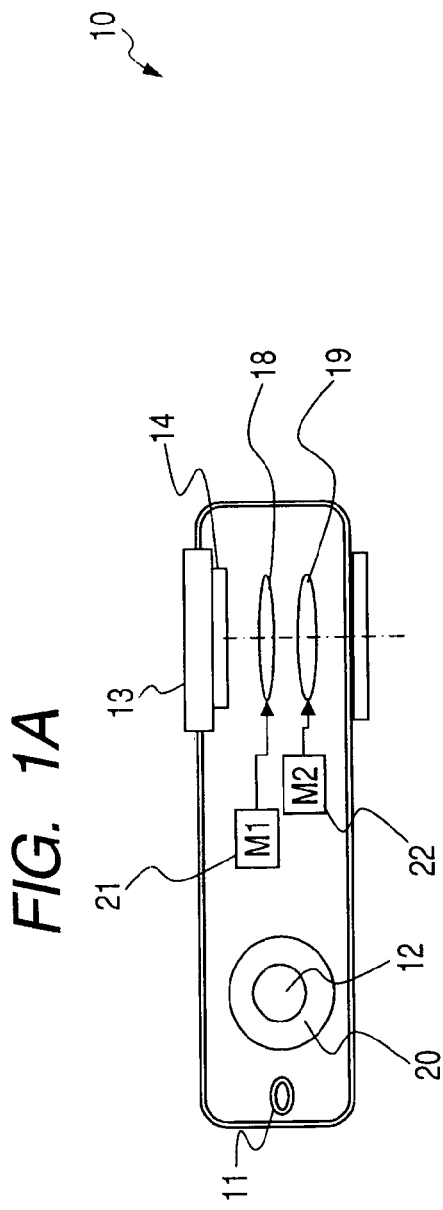
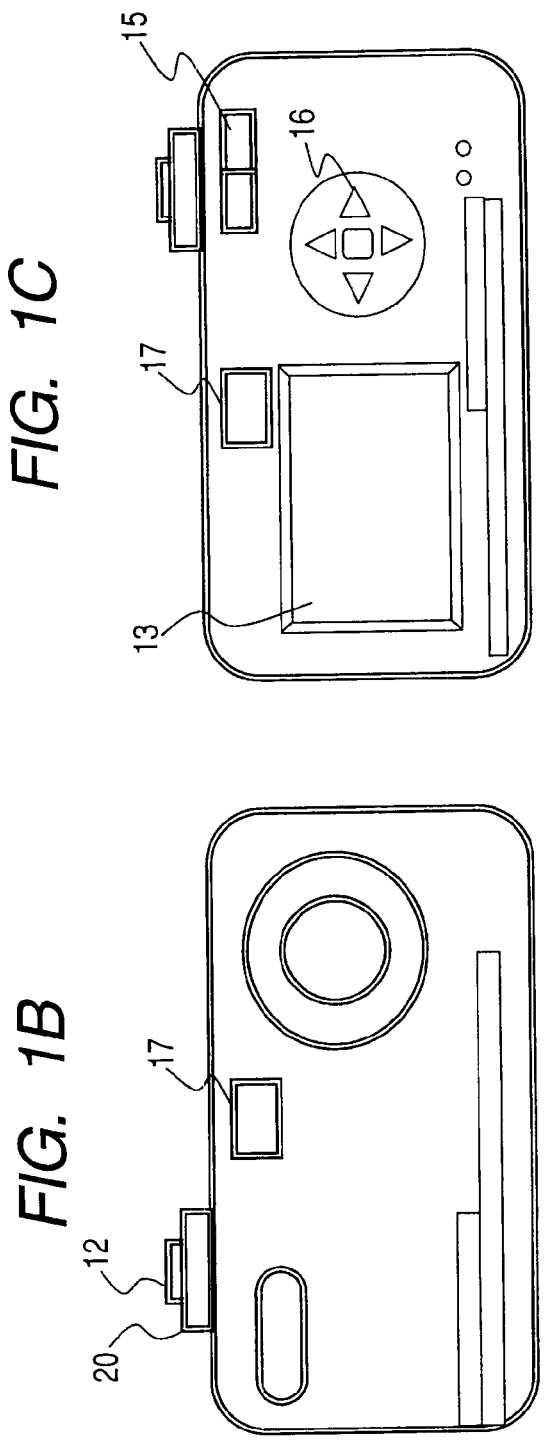
FIG. 1A
FIG. 1B
FIG. 1C

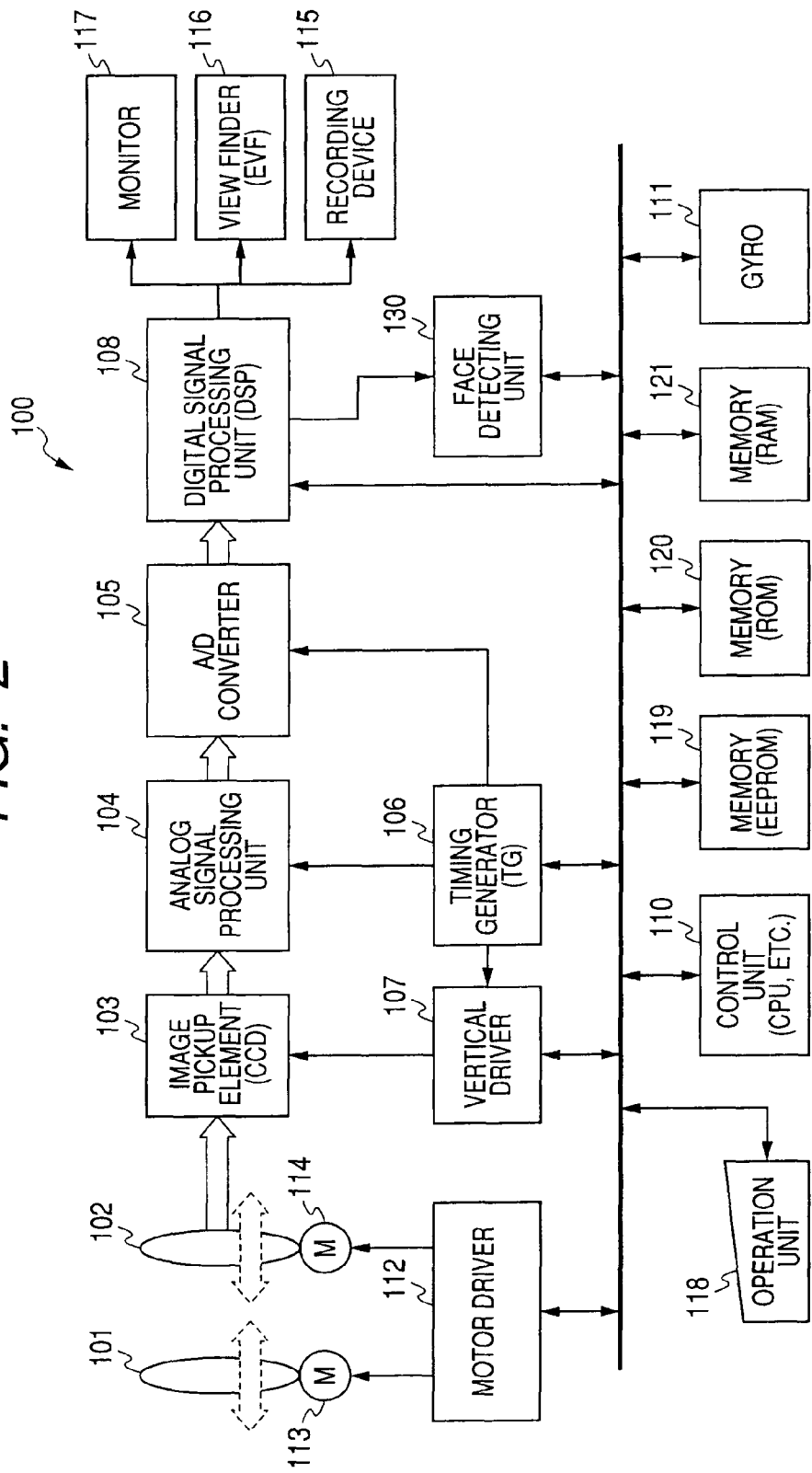

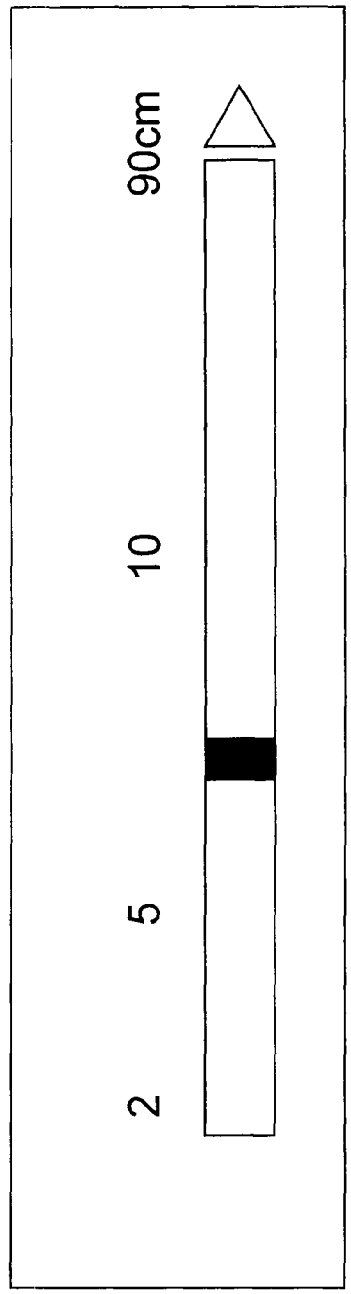
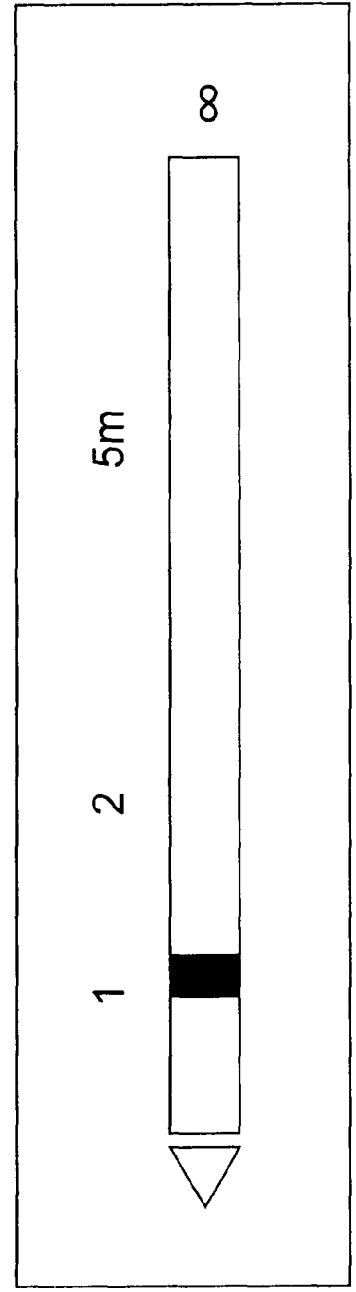
FIG. 4A
FIG. 4B

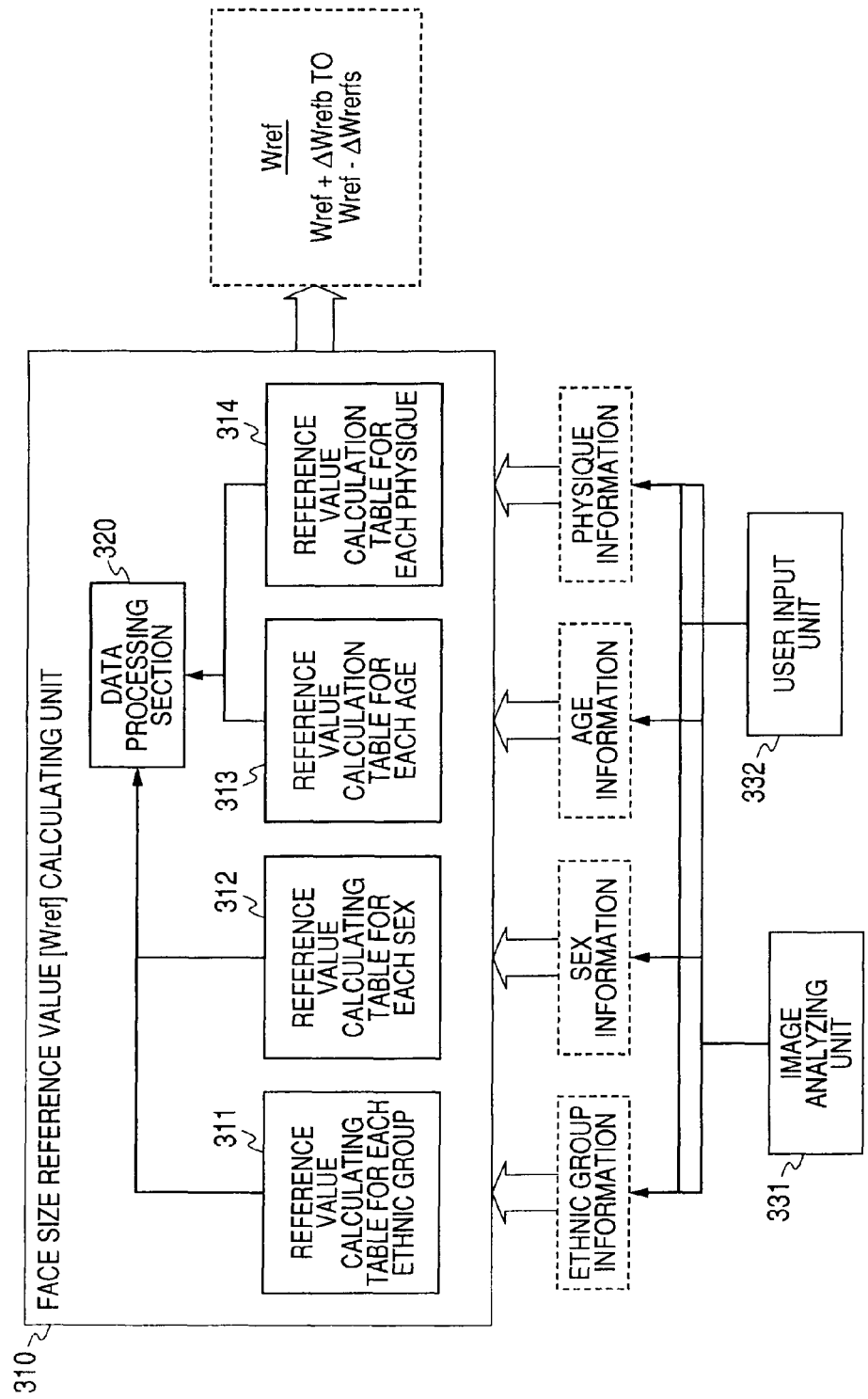

FIG. 7A

REFERENCE VALUE CALCULATING TABLE FOR EACH ETHNIC GROUP

| | HORIZONTAL WIDTH | | VERTICAL LENGTH | |
|---|---|---|---|---|
| | MINIMUM | MAXIMUM | MINIMUM | MAXIMUM |
| COMMON | 8 | 20 | 8 | 28 |
| ASIAN ETHNIC GROUP | 8 | 18 | 9 | 26 |
| EUROPEAN/ AMERICAN ETHNIC GROUP | 8 | 20 | 9 | 28 |
| AFRICAN ETHNIC GROUP | 8 | 17 | 8 | 25 |

FIG. 7B

REFERENCE VALUE CALCULATING TABLE FOR EACH ETHNIC GROUP / SEX

| | SEX | HORIZONTAL WIDTH | | VERTICAL LENGTH | |
|---|---|---|---|---|---|
| | | MINIMUM | MAXIMUM | MINIMUM | MAXIMUM |
| COMMON | COMMON | 8 | 20 | 8 | 28 |
| | MALE | 8 | 20 | 9 | 28 |
| | FEMALE | 8 | 17 | 8 | 26 | ← B ROW
| ASIAN ETHNIC GROUP | COMMON | 8 | 18 | 9 | 26 |
| | MALE | 8 | 18 | 9 | 26 | ← A ROW
| | FEMALE | 8 | 16 | 9 | 24 |
| EUROPEAN/ AMERICAN ETHNIC GROUP | COMMON | 8 | 20 | 9 | 28 |
| | MALE | 8 | 20 | 9 | 28 |
| | FEMALE | 8 | 17 | 9 | 26 |
| AFRICAN ETHNIC GROUP | COMMON | 8 | 20 | 9 | 28 |
| | MALE | 8 | 20 | 9 | 28 |
| | FEMALE | 8 | 17 | 8 | 26 |

FIG. 8C

REFERENCE VALUE CALCULATING TABLE FOR EACH ETHNIC GROUP / SEX / AGE

| | | | HORIZONTAL WIDTH | | VERTICAL LENGTH | |
|---|---|---|---|---|---|---|
| | | AGE | MINIMUM | MAXIMUM | MINIMUM | MAXIMUM |
| ASIAN ETHNIC GROUP | COMMON | COMMON | 8 | 18 | 9 | 26 |
| | | UP TO 3 YEARS OLD | 8 | 12 | 9 | 15 |
| | | 3 TO 12 YEARS OLD | 12 | 14 | 14 | 22 |
| | | OVER 12 YEARS OLD | 12 | 18 | 20 | 26 |
| | MALE | COMMON | 8 | 18 | 9 | 26 → D ROW |
| | | UP TO 3 YEARS OLD | 8 | 12 | 9 | 15 |
| | | 3 TO 12 YEARS OLD | 12 | 14 | 15 | 22 |
| | | OVER 12 YEARS OLD | 13 | 18 | 22 | 26 → C ROW |
| | FEMALE | COMMON | 8 | 16 | 9 | 24 |
| | | UP TO 3 YEARS OLD | 8 | 12 | 9 | 14 |
| | | 3 TO 12 YEARS OLD | 11 | 14 | 14 | 20 |
| | | OVER 12 YEARS OLD | 12 | 17 | 19 | 24 |

FIG. 9D

REFERENCE VALUE CALCULATING TABLE FOR EACH ETHNIC GROUP / SEX / AGE / PHYSIQUE

| | | | PHYSIQUE | HORIZONTAL WIDTH | | VERTICAL LENGTH | |
|---|---|---|---|---|---|---|---|
| | | | | MINIMUM | MAXIMUM | MINIMUM | MAXIMUM |
| ASIAN ETHNIC GROUP | COMMON | COMMON | COMMON | 8 | 18 | 9 | 26 |
| | | | NORMAL | 8 | 17 | 9 | 24 |
| | | | TALL STATURE | 8 | 18 | 9 | 26 |
| | | UP TO 3 YEARS OLD | COMMON | 8 | 12 | 9 | 15 |
| | | | NORMAL | 8 | 12 | 9 | 15 |
| | | | TALL STATURE | 8 | 12 | 9 | 15 |
| | | 3 TO 12 YEARS OLD | COMMON | 11 | 14 | 14 | 22 |
| | | | NORMAL | 11 | 13 | 13 | 20 |
| | | | TALL STATURE | 12 | 14 | 14 | 22 |
| | | OVER 12 YEARS OLD | COMMON | 12 | 18 | 19 | 26 |
| | | | NORMAL | 12 | 16 | 19 | 24 |
| | | | TALL STATURE | 13 | 18 | 20 | 26 |
| | MALE | COMMON | COMMON | 8 | 18 | 9 | 26 |
| | | | NORMAL | 8 | 17 | 9 | 24 |
| | | | TALL STATURE | 8 | 18 | 9 | 26 |
| | | UP TO 3 YEARS OLD | COMMON | 8 | 12 | 9 | 15 |
| | | | NORMAL | 8 | 12 | 9 | 15 |
| | | | TALL STATURE | 8 | 12 | 9 | 15 |
| | | 3 TO 12 YEARS OLD | COMMON | 12 | 14 | 15 | 22 |
| | | | NORMAL | 12 | 13 | 15 | 20 |
| | | | TALL STATURE | 12 | 14 | 15 | 22 |
| | | OVER 12 YEARS OLD | COMMON | 13 | 18 | 22 | 26 |
| | | | NORMAL | 13 | 16 | 22 | 24 |
| | | | TALL STATURE | 14 | 18 | 23 | 26 |
| | FEMALE | COMMON | COMMON | 8 | 16 | 9 | 24 |
| | | | NORMAL | 8 | 15 | 9 | 23 |
| | | | TALL STATURE | 8 | 16 | 9 | 24 |
| | | UP TO 3 YEARS OLD | COMMON | 8 | 12 | 9 | 14 |
| | | | NORMAL | 8 | 12 | 9 | 14 |
| | | | TALL STATURE | 8 | 12 | 9 | 14 |
| | | 3 TO 12 YEARS OLD | COMMON | 11 | 14 | 14 | 20 |
| | | | NORMAL | 11 | 13 | 13 | 19 |
| | | | TALL STATURE | 12 | 14 | 14 | 20 |
| | | OVER 12 YEARS OLD | COMMON | 12 | 17 | 19 | 24 |
| | | | NORMAL | 12 | 15 | 19 | 23 |
| | | | TALL STATURE | 13 | 17 | 20 | 24 |

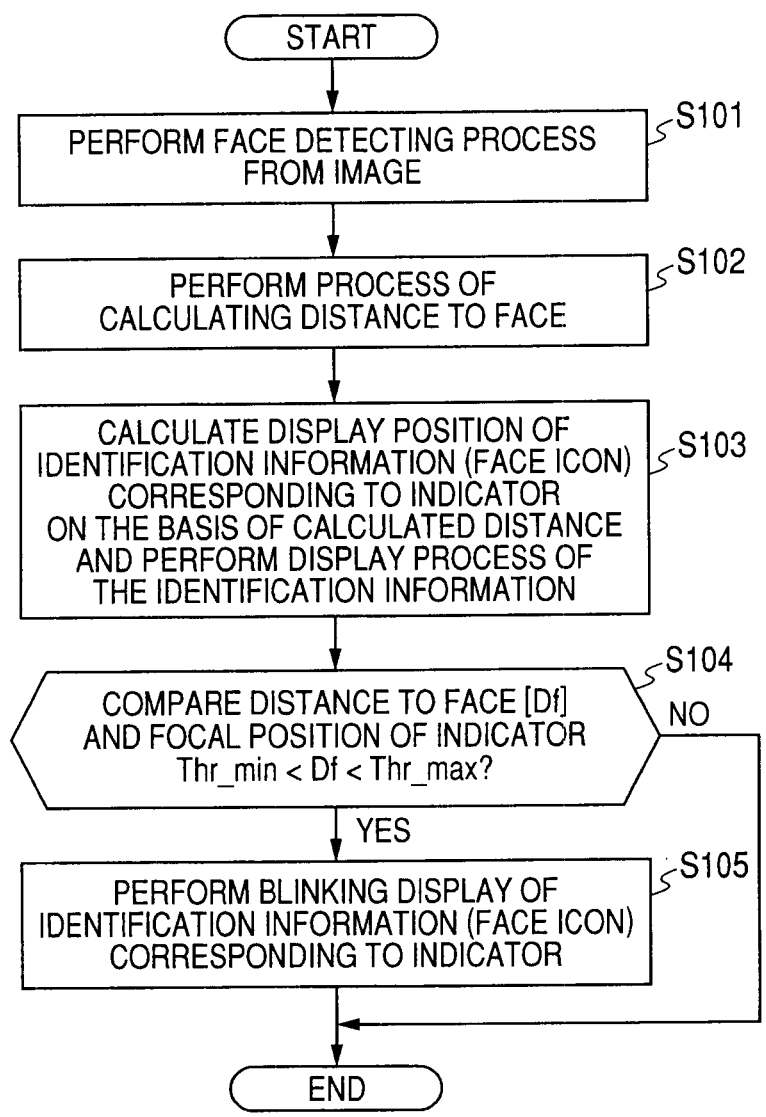

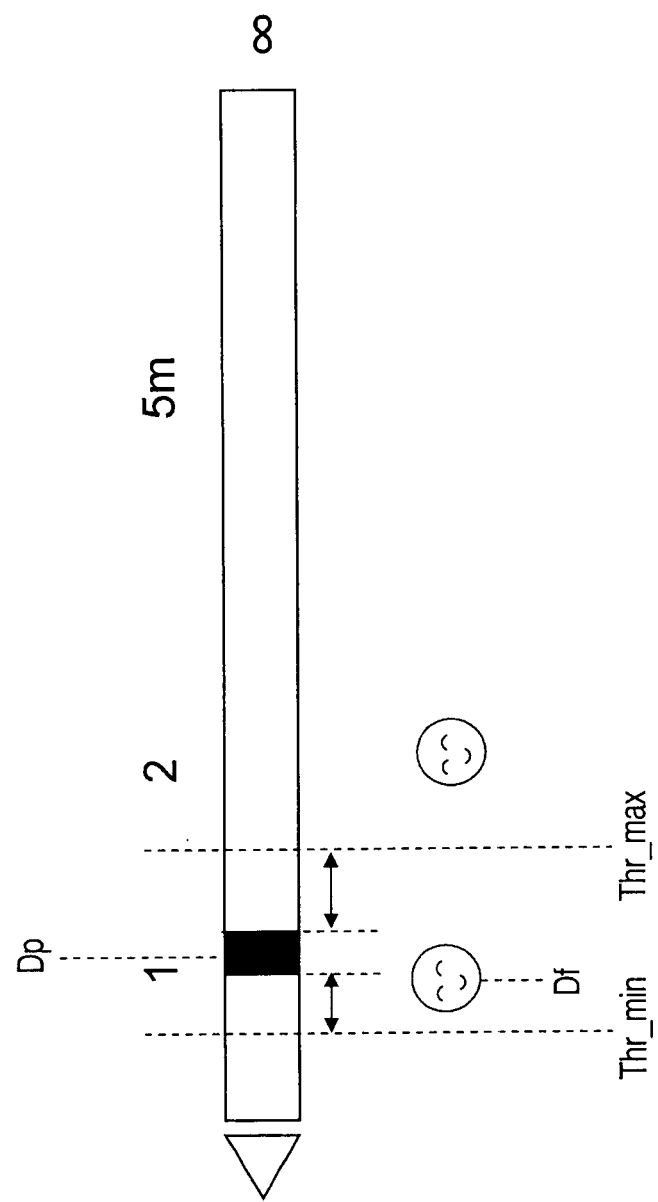

IMAGING APPARATUS, CONTROL METHOD OF IMAGING APPARATUS, AND COMPUTER PROGRAM

CROSS REFERENCES TO RELATED APPLICATIONS

The present invention is a continuation of and claims the benefit of priority under 35 U.S.C. §120 from U.S. application Ser. No. 11/756,207, filed May 31, 2007, which is based upon and claims the benefit of priority under 35 U.S.C. §119 from Japanese Patent Application No. 2006-160453, filed in the Japanese Patent Office on Jun. 9, 2006, the entire contents of which are incorporated herein by reference.

BACKGROUND OF THE INVENTION

1. Technical Field

The present invention relates to an imaging apparatus, a control method of imaging apparatuses, and a computer program, and more particularly, to an imaging apparatus, a control method of imaging apparatuses, and a computer program which are capable of calculating a distance to a subject on the basis of a face of a person as a subject and providing a user with the calculated distance information.

2. Background Art

Focusing processing for bringing an imaging apparatus such as a digital still camera and a digital video camera into focus on a subject includes auto-focus processing in which focus adjustment is performed automatically and manual-focus processing in which focus adjustment is performed by the user operation. Generally, when the focus adjustment is performed by manual-focus operation, adjustment is performed while viewing an image on a monitor such as a liquid crystal display (LCD) and an electronic view finder (EVF).

As reference information for a case where the focus adjustment is performed by a manual operation with an image in the monitor being watched, a configuration in which an indicator indicating a focal distance on the basis of a position of a focus lens is displayed in a monitor screen is, for example, disclosed in JP-A-2004-94103. In addition, a configuration in which an indicator indicating the degree of in-focus for a subject is displayed is disclosed in JP-A-2002-209135 and JP-A-2005-181373.

However, generally, the LCD or EVF as a monitor which is built in the imaging apparatus has a relatively low resolution, and it is difficult to precisely determine whether a target subject is in focus from an image in the monitor. As a technique for solving this problem, an imaging apparatus which has a function of displaying an image in the monitor on an enlarged scale has been provided.

However, when the display on an enlarged scale is performed, there is a problem that detection of an actual distance to a subject from the display on the screen becomes difficult. As a result, a user performs a manual focus operation randomly until a person is in focus, and only after the person is in focus, the user can acquire an approximate distance to the person. In other words, in this case, the indicator rarely performs a function of supporting the manual focus control of the user.

SUMMARY OF THE INVENTION

Under the circumstances, it is desirable to perform a fast and precise focus process for a target subject. More particularly, it is desirable to provide an imaging apparatus, a control method of imaging apparatuses, and a computer program which implement effective user supports in the manual focus process by performing a distance detection on the basis of a face of a person and displaying the detected distance information correlated with a distance indicator.

According to an embodiment of the present invention, there is provided an imaging apparatus including a face detecting unit detecting a face region from an input image input to the imaging apparatus, and a control unit calculating a distance to a subject on the basis of the face size detected by the face detection unit and displaying distance identification information indicating a distance corresponding to the calculated distance in a display unit.

In the imaging apparatus, the control unit may display a distance indicator in the display unit and perform a display process of the distance identification information in a position on the distance indicator corresponding to the distance calculated on the basis of the face size.

In the imaging apparatus, the distance identification information may be a face icon.

In the imaging apparatus, the control unit may display a distance indicator in the display unit and perform a display process of the distance identification information in a position on the distance indicator corresponding to the distance calculated on the basis of the face size.

In the imaging apparatus, the control unit may perform control processes for displaying a face region identification mark identifying a face in the image displayed in the display unit and displaying the face region identification mark and the distance identification information in accordance with a setting that the display color of the face region identification mark and the display color of the distance identification information displayed in the position of the distance indicator are correlated with each other for each face.

In the imaging apparatus, the control unit may perform control processes for displaying a face region identification mark identifying a face in the image displayed in the display unit and displaying a connection line connecting the face region identification mark and the distance identification information displayed in the position on the indicator to each other.

In the imaging apparatus, the control unit may perform a control process for displaying the distance identification information calculated on the basis of a face in proximity of the face in the image displayed in the display unit.

In the imaging apparatus, the control unit may display a distance indicator in the display unit, display focal position information indicating a current focus point in the distance indicator, and display the distance identification information in the position on the distance indicator corresponding to the distance calculated on the basis of the face size, and the control unit may determine whether the distance calculated on the basis of the face size corresponds to a location in proximity of the focal position and is in the range of the focal positions and perform display indicating that the face is in the focal position in a case where the distance is determined to be in the focal position.

In the imaging apparatus, the control unit may blink the distance identification information displayed in the position on the indicator or change the display color of the distance identification information as the display indicating that the face is in the focal position.

In the imaging apparatus, the control unit may perform control processes of displaying a face region identification mark identifying a face in the image displayed in the display unit and blinking the face region identification mark or changing the display color of the face region identification mark as the display indicating that the face corresponding to the face region identification mark is in the focal position.

In the imaging apparatus, the control unit may sequentially calculate distances corresponding to each face for a plurality of face regions detected by the face detecting unit and performs a display process of the distance identification information in positions in the distance indicator corresponding to distances to each face along with the distance indicator to be displayed in the display unit.

In the imaging apparatus, the control unit may sequentially calculate distances corresponding to each face for a plurality of face regions detected by the face detecting unit in accordance with defined priority levels and perform a display process of the distance identification information in the positions on the indicator corresponding to distances to each face along with the distance indicator to be displayed in the display unit, and the control unit may not display the distance identification information again in a case where the display of the distance identification information in an expected display position of the distance identification information has been already completed.

In the imaging apparatus, the defined priority levels may be assigned such that a face region having a larger face size detected by the face detection unit has a higher priority level or that a face region corresponding to a face closer to the center of the image to be analyzed has a higher priority level.

According to another embodiment of the present invention, there is provided a method of controlling an imaging apparatus which performs a information display process, the method including the steps of detecting a face region from an input image input to the imaging apparatus using a face detecting unit, and calculating a distance to a subject on the basis of the face size detected by the face detection unit and displaying distance identification information indicating a distance corresponding to the calculated distance in a display unit using a control unit.

In the method, the calculation of the distance and display of the identification information may include displaying a distance indicator in the display unit and performing a display process of the distance identification information in a position on the distance indicator corresponding to the distance calculated on the basis of the face size.

In the method, the distance identification information may be a face icon.

In the method, the calculation of the distance and display of the identification information may include displaying a distance indicator in the display unit and performing a display process of the distance identification information in the position on the distance indicator corresponding to the distance calculated on the basis of the face size.

In the method, the calculation of the distance and display of the identification information may further include performing control processes for displaying a face region identification mark identifying a face in the image displayed in the display unit and displaying the face region identification mark and the distance identification information in accordance with a setting that the display color of the face region identification mark and the display color of the distance identification information displayed in the position of the distance indicator are correlated with each other for each face.

In the method, the calculation of the distance and display of the identification information may further include performing control processes for displaying a face region identification mark identifying a face in the image displayed in the display unit and displaying a connection line connecting the face region identification mark and the distance identification information displayed in the position of the indicator to each other.

In the method, the calculation of the distance and display of the identification information may further include performing a control process for displaying the distance identification information calculated on the basis of a face in proximity of the face in the image displayed in the display unit.

In the method, the calculation of the distance and display of the identification information may include displaying a distance indicator in the display unit, displaying focal position information indicating a current focus point in the distance indicator, and displaying the distance identification information in the position on the distance indicator corresponding to the distance calculated on the basis of the face size, and the control unit may determine whether the distance calculated on the basis of the face size corresponds to a location in proximity of the focal position and is in the range of the focal positions and perform display indicating that the face is in the focal position in a case where the distance is determined to be in the focal position.

In the method, the determining and performing of displaying indicating that the face is in the focal position may include blinking the distance identification information displayed in the position on the indicator or changing the display color of the distance identification information as the display indicating that the face is in the focal position.

In the method, the control unit may display a face region identification mark identifying a face in the image displayed in the display unit and may blink the face region identification mark or change the display color of the face region identification mark as the display indicating that the face corresponding to the face region identification mark is in the focal position.

The method may further include sequentially calculating distances corresponding to each face for a plurality of face regions detected by the face detecting unit and performing a display process of the distance identification information in positions in the distance indicator corresponding to distances to each face along with the distance indicator to be displayed in the display unit, by using the control unit.

The method may further include sequentially calculating distances corresponding to each face for a plurality of face regions detected by the face detecting unit in accordance with defined priority levels, performing a display process of the distance identification information in the positions on the indicator corresponding to distances to each face along with the distance indicator to be displayed in the display unit by using the control unit, and not displaying the distance identification information again in a case where the display of the distance identification information in an expected display position of the distance identification information has been already completed, by using the control unit.

In the method, the defined priority levels may be assigned such that a face region having a larger face size detected by the face detection unit has a higher priority level or that a face region corresponding to a face closer to the center of the image to be analyzed has a higher priority level.

According to another embodiment of the present invention, there is provided a computer program which allows a computer to perform an information display process control in an imaging apparatus, the computer program allowing a computer to perform the steps of detecting a face region from an input image input to the imaging apparatus using a face detecting unit, and calculating a distance to a subject on the basis of the face size detected by the face detection unit and displaying distance identification information indicating a distance corresponding to the calculated distance in a display unit using a control unit.

The computer program according to the another embodiment of the present invention, for example, may be provided on a storage medium, or a communication medium which are provided in a computer-readable format, for example, a storage medium such as CD, FD, or MO or a communication medium such as a network, for general-purpose computer systems that can execute various program codes. By providing the computer program in a computer-readable format, a process on the basis of the computer program is performed in a computer system.

Other objects, features, or advantages of the present invention will be disclosed in the detailed description on the basis of exemplary embodiments or accompanying drawings. A "system" in the following description is a configuration of a logical combination of a plurality of devices and is not limited to a case where each constituent device is in one body.

According to an embodiment of the present invention, a face detecting process and a distance calculating process are performed in an imaging apparatus, and a distance identification information such as a face icon is displayed in a position corresponding to the calculated distance in the distance indicator which is displayed on a monitor screen or a viewfinder. The user can intuitively recognize a distance to the person from the display of the distance identification information and also can easily recognize an approximate distance to the person from the face icon displayed in the distance indicator in a focus adjustment process by a manual focus operation, whereby the manual focus control (focus adjustment) can be performed efficiently and precisely.

According to another embodiment of the invention, a set color for a face region identification mark which is configured to surround a subject image displayed in a monitor or a view finder and the color of the distance identification information such as a face icon correspondently displayed in the distance indicator are configured to be identical to each other or a connection line is connected for displaying, and thus it is easy to recognize a distance to a target subject even in a case where a plurality of faces are displayed in the monitor, whereby it becomes possible to precisely perform a focus adjustment operation on the target subject.

BRIEF DESCRIPTION OF THE DRAWINGS

FIGS. 1A to 1C are diagrams showing an external appearance of an imaging apparatus according to an embodiment of the present invention.

FIG. 2 is a diagram showing a hardware configuration of an imaging apparatus according to an embodiment of the present invention.

FIGS. 4A and 4B are diagrams showing examples of distance indicators according to an embodiment of the present invention.

FIG. 6 is a diagram showing a configuration and process of a face size reference value calculating unit according to an embodiment of the present invention.

FIGS. 7A and 7B are diagrams showing examples of reference value calculating tables which are used in a face size reference value calculating unit according to an embodiment of the present invention.

FIG. 8C is a diagram showing an example of a reference value calculating table which is used in a face size reference value calculating unit according to an embodiment of the present invention.

FIG. 9D is a diagram showing an example of a reference value calculating table which is used in a face size reference value calculating unit according to an embodiment of the present invention.

FIG. 10 is a flowchart showing the sequence of face detection, distance calculation, and display control on the basis of the calculated distance information of an imaging apparatus according to an embodiment of the present invention.

FIG. 11 is a diagram showing a condition for a process of blinking a face icon.

DETAILED DESCRIPTION OF PREFERRED EMBODIMENTS

Figure 3:
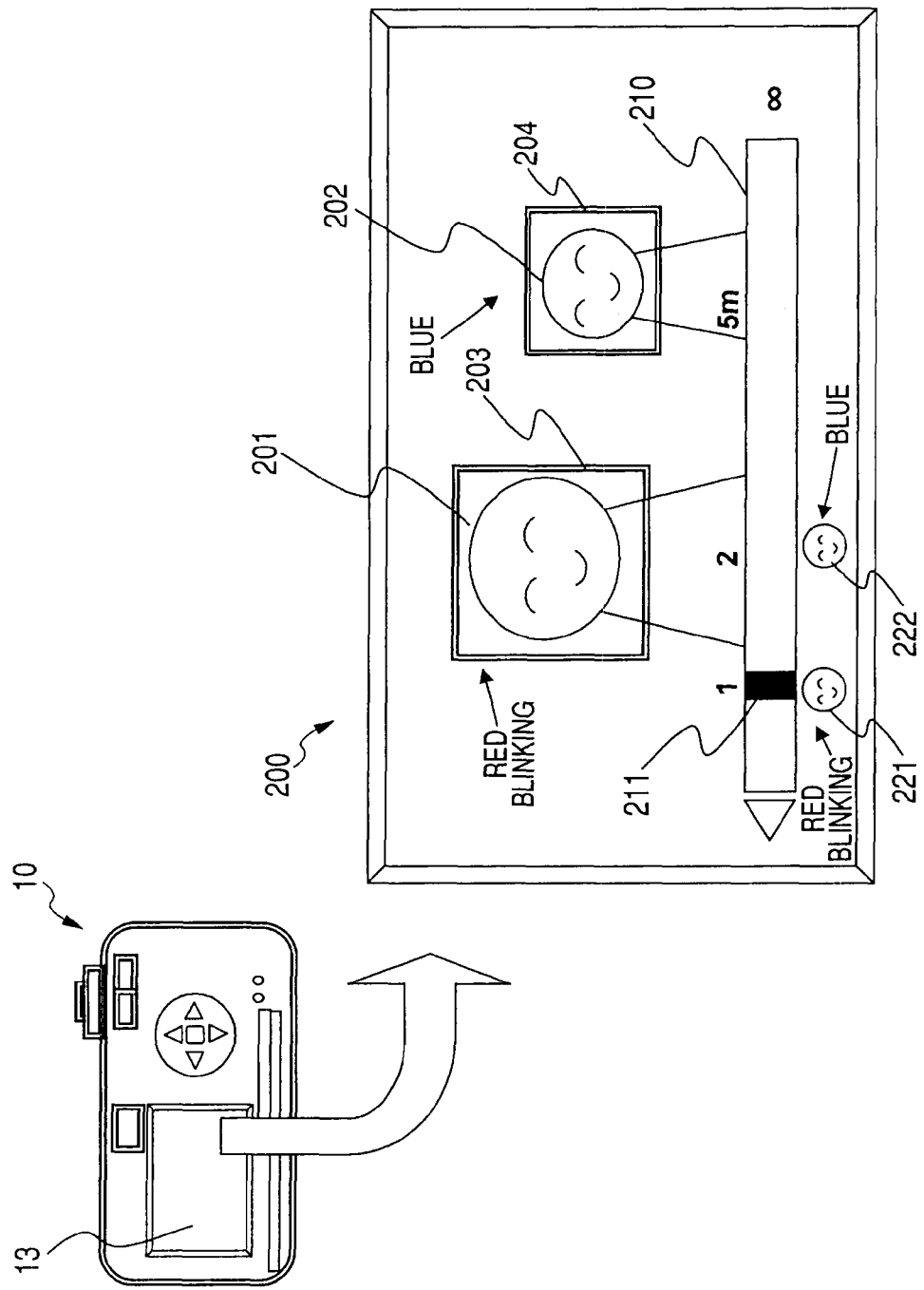
FIG. 3 is a diagram showing an example of data display in an imaging apparatus according to an embodiment of the present invention.

Hereinafter, an imaging apparatus, a control method of imaging apparatuses, and a computer program according to embodiments of the present invention will be described in detail with reference to accompanying drawings. An imaging apparatus according to an embodiment of the invention detects a face of a person which is a subject, calculates a distance to the detected face, and displays information on the calculated distance in a display unit of the imaging apparatus, that is, a monitor screen or a viewfinder and an indicator, therefore user support in a manual focus process is implemented. In other words, information enabling a user (photographer) to intuitively recognize a distance to a person as a subject is provided, whereby the manual focus operation can be performed efficiently and precisely.

To be more specifically, when a photographer photographs a person by performing a manual focus operation, a face detecting process and a distance calculating process are performed, and distance identification information such as a face icon is displayed on a distance indicator which is displayed on a monitor screen or a viewfinder or in a position adjacent to the indicator corresponding to the calculated distance. The photographer can intuitively recognize the distance to the person from the display. Since the photographer can easily recognize an approximate distance to the person by the face icon additionally displayed on the indicator before performing focus adjustment through a manual focus operation, the photographer can perform the manual focus control (focus adjustment) effectively and precisely.

In addition, the color of a focus adjustment frame which is configured to surround a subject, for which the focus adjustment has been completed, to be displayed and the color of the distance identification information such as a face icon correspondently displayed on the indicator are configured to be the same, and thus, the distance to the target subject can be easily recognized even in a case where a plurality of faces are displayed on the monitor, whereby it becomes possible to precisely perform a focus adjustment process for the target subject.

The face icon on the focus indicator is configured to change its display position in accordance with the forward/backward movement (the distance to the subject is moved forward/backward) of a person, and when the person moves, display in accordance with the movement is performed, whereby the user can recognize the movement of the subject from the monitor screen.

At first, the configuration of an imaging apparatus according to an embodiment of the present invention will be described. FIGS. 1A to 1C are diagrams showing an external appearance of an imaging apparatus 10 according to an embodiment of the invention. FIG. 1A is a top view, FIG. 1B is a front elevation, and FIG. 1C is a bottom view of the imaging apparatus 10. A lens part in FIG. 1A is represented as sectional view. The imaging apparatus 10 includes a power switch 11, trigger means, that is, a release switch 12 serving as a shutter, a monitor 13 for displaying an image (through image) photographed by the imaging apparatus or operation information, an imager 14 as an imaging device (CCD), a zoom button 15 for performing zoom control, an operation button 16 for inputting various operation information such as a manual focus process, a viewfinder 17 for checking image (through image) photographed by the imaging apparatus, a focus lens 18 driven in a focus adjustment operation, a zoom lens 19 driven in a zoom adjustment operation, a mode dial 20 for setting a photograph mode, a focus lens motor (M1) 21 for driving the focus lens 18, and a zoom lens motor (M2) 22 for driving the zoom lens 19.

The image of the subject is displayed in the viewfinder 17 and on the monitor 13 which are display units. The viewfinder 17 and the monitor 13, for example, are configured by an LCD, respectively, and an image of the subject passing through the lens is displayed as a motion picture. The motion picture is called a through image. A user checks the viewfinder 17 or the monitor 13 for checking a target subject for photographing and pushes the release switch 12 as a shutter, whereby the recording process of the image is to be performed.

The internal configuration of an imaging apparatus 100 according to an embodiment of the invention will be described with reference to FIG. 2. The incident light passing through a focus lens 101 and a zoom lens 102, for example, is input to an imaging device 103 such as a CCD (Charge Coupled Device) and is photoelectric-converted in the imaging device 103. The photoelectric-converted data is input to an analog signal processor 104, a process such as noise removing process is performed on the data by the analog signal processor 104, and the data is converted into a digital signal in an A/D converter 105. Various signal processing and correction processes are performed in a digital signal processor 108 on the data that has been converted into a digital signal in the A/D 105, and the data processed by the digital signal processor 108 is recorded in a recording device 115, for example, including a flash memory. In addition, the processed data is displayed in a monitor 117 and a viewfinder (EVF) 116. In the monitor 117 and the viewfinder (EVF) 116, an image passing through the lenses is displayed as a through image regardless of performing image pickup.

An operation unit 118 includes the release switch 12, the zoom button 15, the operation button 16 for inputting various operation information such as manual focus process operation information, and the mode dial 20 for setting a photograph mode which are disposed in a camera main body described with reference to FIGS. 1A to 1C.

A control unit 110 includes a CPU and performs control operations for various processes performed by the imaging apparatus on the basis of program stored in a memory (ROM) 120 or the like in advance. A memory (EEPROM) 119 is non-volatile, and image data, various auxiliary information, programs, and the like are stored therein. The memory (ROM) 120 stores a program, an operation parameter, or the like which is used by the control unit (CPU) 110. A memory (RAM) 121 stores a program used by the control unit (CPU) 110, a parameter that changes appropriately in the operation of the control unit, or the like. A gyro 111 detects the inclination, shaking, or the like of the imaging apparatus. The detected information is input to the control unit (CPU) 110, and a process such as a process for preventing hand blur is performed.

A motor driver 112 drives a focus lens driving motor 113 set in accordance with the focus lens 101 and a zoom lens driving motor 114 set in accordance with the zoom lens 102. A vertical driver 107 drives the imaging device (CCD) 103. A timing generator 106 generates a control signal for process timings of the imaging device 103 and the analog signal processor 104 and controls the process timings thereof.

A face detecting unit 130 detects a face region of a person in image data by analyzing the image data input through a lens. The detected information is sent to the control unit 110, and the control unit 110 determines a face region of a person as a target subject and measures a distance to the subject on the basis of the determined face region.

The imaging apparatus according to an embodiment of the present invention can perform a manual focus adjustment, that is, a manual focus process as a focus process. When a photographer photographs a person by a manual focus operation, the face detection unit 130 performs a face detecting process, the control unit 110 performs a distance calculating process on the basic of the detected face information and displays distance identification information such as a face icon in a position corresponding to the calculated distance on a distance indicator which is displayed in the monitor 117 or the viewfinder 116. The photographer can intuitively recognize a distance to the person from the display of the distance identification information.

A detailed example of the display is shown in FIG. 3. As shown in FIG. 3, display information 200 shown in the figure is displayed on the monitor 13 of the imaging apparatus 10. Here, although only the monitor 13 is shown, a same image is displayed in the viewfinder. In the display information 200, a distance indicator 210 is displayed together with an image (through image) that is currently in a photographing process. The distance indicator 210 in the example, shown in the figure, indicates a close distance in the left end and an infinite distance in the right end. Focal position information 211 corresponding to a focus setting distance position which corresponds to the current position of the focus lens is appeared on the distance indicator. The focal position information 211 slides on the distance indicator in accordance with the movement of the focus lens on the basis of a user's manual focus adjustment.

In the imaging apparatus according to an embodiment of the invention, a face icon as shown in the figure is displayed in a position on the indicator corresponding to the calculated distance on the basis of the calculated distance information which is acquired by the face region detection by the face detecting unit 130 and the calculation of the distance to the face by the control unit 110. In the example shown in the figure, a face icon 221 appears in a position on the indicator corresponding to the calculated distance (about 1 m) for a face 201 included in the displayed image as a through image, and a face icon 222 in the displayed image appears in a position on the indicator corresponding to the calculated distance (about 2.2 m) for a face 202. These face icons are displayed in colors different from each other respectively corresponding to the faces 201 and 202. These colors are respectively correlated with the set colors of face region identification marks 203 and 204 appearing on the monitor image corresponding to the faces to which distances are calculated. The face region identification marks 203 and 204 are also used as focus frames, that is, information for indicating the success of focus adjustment for the subjects, and when the focus adjustment is succeeded, the face region identification marks 203 and 204 are displayed blinking. In addition, when the focus adjustment is succeeded, the face icons 221 and 222 are also displayed blinking.

In the example shown in the figure, a red face region identification mark 203 is displayed for the face 201, and a blue face region identification mark 204 is displayed for the face 202. The colors of the face icons indicating distance information are displayed such that the face icon 221 corresponding to the distance calculated for the face 201 is displayed in red and the face icon 222 corresponding to the distance calculated for the face 202 is displayed in blue. With the display color, the user can know which subject is what distance in a moment.

As described above, the face region identification marks 203 and 204 are used as focus frames, additionally. When a subject is in focus (focus adjustment success) by the focus adjusting process of the imaging apparatus, an in-focus display is performed so as to make the subject in the monitor image for which the focus adjustment is completed identifiable. The in-focus display is identification information displayed for indicating the completion of the focus adjustment in the image displayed in the monitor or the viewfinder, and, for example, a frame surrounding a face is displayed as the in-focus frame, generally. The user checks this in-focus display and presses the shutter for photographing, whereby a precise photographing can be made.

In the configuration according to the embodiment of the invention, a face region identification mark is displayed blinking to indicate the success of focus adjustment. For example, in the example shown in the figure, the focus adjustment for the face 201 is succeeded, and in this case, the face region identification mark 203 is displayed to be blinking. At this time, the face icon 221 corresponding to the calculated distance for the face 201 is displayed to be blinking. The user checks the success of focus adjustment on the basis of the blinking display and presses the shutter for photographing, whereby photographing an image with precise focus adjustment can be performed.

The display of the distance indicator 210 is converted on the basis of the distance to the subject. In other words, as shown in FIGS. 4A and 4B, the display mode is shifted among a plurality of distance indicators having different distance ranges. FIG. 4A shows a distance indicator having the distance range of 2 to 90 cm, and FIG. 4B shows a distance indicator having the distance range of 90 to infinity. As described above, one of the plurality of distance indicators are selected to be displayed. For example, when all the distances calculated on the basis of faces, which are detected by the face detecting unit 130, by the control unit 110 are within 90 cm, the control unit 110 displays the distance indicator shown in FIG. 4A and performs a process of displaying a face icon on the distance indicator or in proximity thereof. On the other hand, when there is a face to which the calculated distance is greater than 90 cm, the control unit 110 displays the distance indicator shown in FIG. 4B and performs a process of displaying a face icon on the distance indicator or in proximity thereof.

When an imaging apparatus according to an embodiment of the invention is used, a photographer can easily recognize an approximate distance to a person by the display on the distance indicator 210 as shown in FIG. 3, before performing focus adjustment through a manual focus operation, and accordingly, the photographer can perform the manual focus control (focus adjustment) effectively and precisely. The face icon on the focus indicator is configured to change its display position in accordance with the forward/backward movement (the distance to the subject is moved forward/backward) of a person, and when the person moves, display in accordance with the movement is performed, whereby the user can recognize the movement of the subject from the monitor screen.

In the imaging apparatus according to an embodiment of the invention, a face region of a person in the target subject is determined on the basis of the image data photographed by the imaging apparatus and a distance calculating process is performed on the basis of the face image. In other words, a face region detecting process using the face detection unit 130 and a calculation process of the distance to the face using the control unit 110 are performed. Hereinafter, the detailed configuration for the processes will be described. The description is performed in the order of the following contents.

(1) Face Identification Process
(2) Subject Distance Calculating Process on the Basis of Face Size
(1) Face Identification Process At first, the process performed by the face detecting unit 130, that is, a technique for determining a face region of a person from image data acquired by the imaging apparatus will be described. As a technique for recognizing and tracking a face, various techniques in related art have been disclosed, and the techniques can be applied. For example, by matching a template in which information on the luminance distribution of the face is recorded with an actual image, the determination of the face region of the person can be implemented as shown in JP-A-2004-133637. At first, a plurality of images to which a size-reduction process has been performed are prepared. A group of templates of luminance distribution information of the face which can be acquired in a case where the face is tilted in the plurality of images is prepared, and the templates are matched one by one. The templates are acquired by tilting the face with respect to each X, Y, and Z axes of a three-dimensional orthogonal coordinate system, and by performing a match with the templates, the tilt of the actual face is determined.

If a region of the size-reduced image matches with a template when the size-reduced image is moved gradually in a two-dimensional plane, then the region becomes a region in which a face exists, and the size of the face can be acquired from the reduction ratio of the actual image. In addition, the rotation angles around the orthogonal three axes, a yaw angle, a pitch angle, and a roll angle can be obtained from the template used at that time. The calculation of the distance to the face is performed by using the resultant size, position, and rotation angles of the face.

As described above with reference to FIG. 3, on the basis of the distance information calculated from the face image, the distance identification display such as a face icon is performed in a position corresponding to the calculated distance position on the indicator which is displayed in a display unit such as the monitor 117 and the viewfinder (EVF) 116.

(2) Subject Distance Calculating Process on the Basis of Face Size

Figure 5:
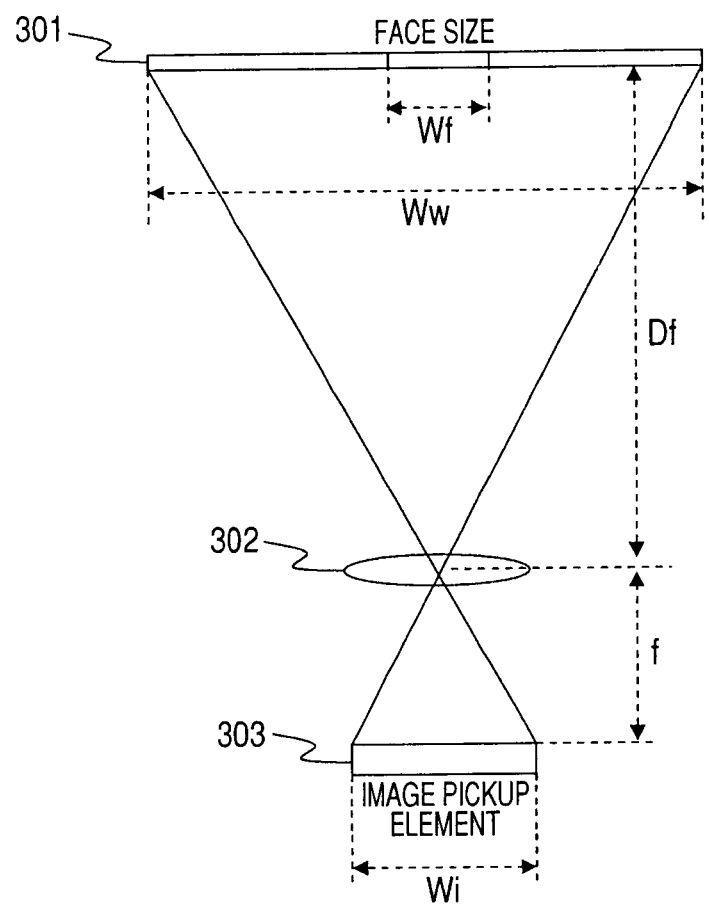
FIG. 5 is a diagram showing a subject distance calculating process on the basis of a face size according to an embodiment of the present invention.

Hereinafter, a detailed calculation method of the distance to the face will be described. In the imaging apparatus according to an embodiment of the invention, the distance to the face is acquired on the basis of the size of a face included in an image photographed by the imaging apparatus. This process will now be described with reference to FIG. 5. In FIG. 5, the position of a subject 301, a focus lens 302, and an imaging apparatus 303 are represented. In the position of the subject 301, a face of a person exists. The face size (width of the face) is Wf.

When the actual face size Wf is known, the distance Df to the face, that is, the distance Df to the subject which is a distance from the focus lens 302 to the position of the subject 301 can be acquired using the following equation on the basis of a basic physical theory for lenses.

$$Df = Wref \times (f/Wi) \times (Ww/Wf) \quad \text{(Equation 1.1)}$$

The description for the symbols in the equation above is followed below.

Wref: face size reference value of a person
Wi: width of the imaging apparatus
f: focal distance
Wf: number of pixels (value detected by the imaging apparatus) of the face size of a person in the imaging apparatus
Ww: number of pixels (value detected by the imaging apparatus) of the size of an image used for detection of the face of a person As the face size reference value Wref of a person, a predetermined fixed value may be used. A process of setting the face size reference value Wref of a person to a value set in consideration with an individual difference, an ethnic group difference, an age difference, a sex difference, and the like may be performed, and more precise distance estimation can be made by the process. The configuration for the process will be described in a latter part.

The imaging apparatus calculates the distance Df to the subject by using above-described Equation 1.1 on the basis of the image (through image) photographed by the imaging apparatus and displays an identifier such as a face icon in a position corresponding to the calculated distance on the distance indicator displayed in the display unit as described with reference to FIG. 3 on the basis of the calculated the distance Df to the subject. As described above, when a plurality of faces are included in the image, the distances corresponding to each face are calculated. Icons in different colors corresponding to each face and face region identification marks for each face are displayed.

The face size reference value Wref of a person which is used in the distance calculating equation Equation 1.1 may be a predetermined fixed value, but a process of setting the face size reference value Wref of a person to a value set in consideration of an individual difference, an ethnic group difference, an age difference, a sex difference, and the like may be performed. The configuration of the process will now be described with reference to FIG. 6 and other figures thereafter. The process is configured such that the face size reference value Wref of a person is set to an appropriate value in accordance with the ethnic group, sex, age, and physique corresponding to the subject for calculating a precise distance Df to the subject. For this process, the face size reference value Wref of a person corresponding to various ethnic groups, sexes, ages, and physiques is calculated for being used. For example, table data for calculating the face size reference value Wref of a person corresponding to various ethnic groups, sexes, ages, and physiques is maintained, the information on the ethnic group, sex, age, and physique corresponding to the subject is acquired on the basis of the analysis result of an image or information input from the user and the face size reference value Wref in accordance with the subject is acquired from a table on the basis of the acquired information.

It is possible to estimate the ethnic group, sex, age, and physique of a person having a face by the analysis of the image of the face included in the image photographed by the imaging apparatus. In other words, parts of the face are identified, and the parts are matched with part information registered in advance corresponding to each ethnic group, sex, age, and physique, whereby the ethnic group, sex, age, and physique of the subject are estimated. Alternatively, a user such as a photographer inputs subject information on the ethnic group, sex, age, and physique as subject information, and the input information may be applied.

As described above, the information on the ethnic group, sex, age, and physique of the subject is acquired from the image analysis process or the user's input information, whereby an appropriate face size reference value Wref in accordance with the subject is acquired. An example of this process will be described with reference to FIG. 6.

As shown in FIG. 6, the imaging apparatus includes a face size reference value Wref calculating unit 310. The face size reference value Wref calculating unit 310 includes a reference value calculating table 311 for each race, a reference value calculating table 312 for each sex, a reference value calculating table 313 for each age, a reference value calculating table 314 for each physique, and a data processing section 320.

An image analyzing unit 331 can estimate the ethnic group, sex, age, and physique of a person having a face by the analysis of the image of the face included in the image photographed by the imaging apparatus. In other words, parts of the face are identified, and the parts are matched with part information registered in advance corresponding to each ethnic group, sex, age, and physique, whereby the ethnic group, sex, age, and physique of the subject are estimated. Then, the estimated information is input to the face size reference value Wref calculating unit 310. Alternatively, a user such as a photographer may input subject information on the ethnic group, sex, age, and physique as subject information through a user input unit 332, and the input information may be input to the face size reference value Wref calculating unit 310.

The face size reference value Wref calculating unit 310 calculates an optimal reference value Wref by applying the tables on the basis of the subject information which is input from the image analyzing unit 331 or the user input unit 332. A reference value range Wref=(Wref+ΔWrefb) to (Wref−ΔWrerfs) in consideration with non-uniformity of actual outputs to some degree may be calculated. In this case, resultant values in consideration with an assumed upper discrepancy of ΔWrefb and an assumed lower discrepancy of ΔWrefs are output.

Examples of the tables will now be described with reference to FIGS. 7A to 9D. FIG. 7A is a reference value calculating table for each race, FIG. 7B is a reference value calculating table for each race and sex, FIG. 8C is a reference value calculating table for each race, sex, and age, and FIG. 9D is a reference value calculating table for each race, sex, age, and physique. In the example of the configuration shown in FIG. 6, tables are respectively configured for a race, a sex, an age, and a physique are configured, but the tables may be configured in various forms as shown in FIGS. 7A to 9D instead of configuring tables for a race, a sex, an age, and a physique, respectively.

For example, when only the race of the subject can be estimated on the basis of the subject information input through the image analyzing unit 331 or the user input unit 332, the reference value calculating table for each race shown in FIG. 7A is used. When the race cannot be determined, data for "common" is used.

When the race and sex of the subject can be estimated/ determined on the basis of the subject information input through the image analyzing unit 331 or the user input unit 332, the reference value calculating table for each race and sex shown in FIG. 7B is used. When the subject is included in an Asian ethnic group and male, then, data in a column A shown in FIG. 7B is used. On the other hand, when the sex of the subject is estimated/determined to be female while the race of the subject can not be identified, data in a column B shown in FIG. 7B which represents the race for common and the sex for female is used.

Likewise, when the age group of the subject can be estimated/determined additionally, the reference value calculating table for each race, sex, and age shown in FIG. 8C is used. When it is known that the subject is in an Asian ethnic group, male, and twelve years old, data in a row C shown in FIG. 8C is used, and when the age group can not be estimated for any reason, data in a row D shown in FIG. 8C is used. Likewise, when the physique of the subject can be estimated/determined additionally, the reference value calculating table for each race, sex, age, and physique shown in FIG. 9D is used for calculating an optimal reference value Wref=(Wref+ ΔWrefb) to (Wref−ΔWrerfs).

As described above, it is possible to acquire an appropriate face size reference value Wref by obtaining the race, sex, age, and physique of the subject on the basis of the image analysis or user's input information, and the distance Df to the subject can be calculated precisely further by using the calculated reference value Wref. For the process of the application of the reference value Wref or the process of the calculation of the distance Df to the subject, one between the horizontal width of a face and the vertical length of a face may be used or the both the horizontal width and vertical length of a face may be used. Moreover, the tilt of the subject may be considered for the processes.

As described above, an identifier such as a face icon is displayed in a position corresponding to the calculated distance on the distance indicator displayed in the display unit as described with reference to FIG. 3 on the basis of the distance Df to the subject which is calculated on the basis of the face size of the subject. When a plurality of faces are included in the image, the distances corresponding to the faces are respectively calculated, and icons in different colors corresponding to each face and face identification marks for each face are displayed.

The display position of the icon corresponding to the distance indicator is determined for being displayed by performing a normalization process which correlates the calculated distance Df that is calculated on the basis of the face size with the display distance of the indicator displayed in the display unit.

Next, the sequence of processes performed in the imaging apparatus according to an embodiment of the invention will be described with reference to a flowchart shown in FIG. 10. The processes shown in the flowchart of FIG. 10 are performed by controlling constituent units such as the face detecting unit 130 under the control of the control unit 110 of the imaging apparatus shown in FIG. 2. At first, in a step S101, a face region is detected from an acquired image of the imaging apparatus by the face detecting unit 130. As described above, for example, the face region in the acquired image is determined by matching a template in which information on the luminance distribution of the face is recorded with an actual image for the detection.

Next, in a step S102, the distance to the detected face is calculated. The above-described equation Equation 1.1, that is, Df=Wref×(f/Wi)×(Ww/Wf) is applied to a basic equation for the calculation of the distance to the subject.

In the calculation process of the distance, as described above, a face size reference value Wref corresponding to the ethnic group, sex, age, and physique of the person may be used.

Next, in a step S103, the calculation process of the display position of the distance identification information (face icon) which is displayed corresponding to the distance indicator displayed in the display unit on the basis of the calculated distance information and the display process of the distance identification information are performed. In the processes, the display position is determined by performing a normalization process which correlates the calculated distance Df calculated on the basis of the face size with the display of the indicator, and the display of the distance identification information is performed.

Next, in a step S104, the calculated distance Df to the face and the distance indicated by the indicator focal position information are compared with each other, whereby it is determined whether the current position (focal position) of the focus lens is in the focal position for the face of the subject to which the distance is calculated. To be more specific, as shown in FIG. 11, it is verified whether the calculated distance Df to the face is in proximity of a focal position Dp appearing on the indicator. In other words, it is determined whether the calculated distance Df to the face is in the allowed range Thr_min to Thr_max of focal distances calculated from the focal position Dp.

When the distance Df to the face is determined to be in the allowed range Thr_min to Thr_max of focal distances which is calculated from the focal distance Dp, the process proceeds to a step S105, and the distance identification information (face icon) which is displayed additionally on the indicator is displayed blinking. In addition, as described above with reference to FIG. 3, the face region identification mark used as a focus frame is displayed blinking. The use checks the in-focus display and then, presses the shutter for photographing, whereby a precise photographing can be performed.

On the other hand, when the distance Df to the face is determined not to be in the allowed range Thr_min to Thr_ max of focal distances in the step S104 which is calculated from the focal distance Dp, the blink process in the step S105 is not performed, and the process ends. However, the processes of the steps S101 to S105 are continuously performed while the imaging apparatus is set to a manual focus mode, and when the result of the determination in the step S104 becomes "Yes" in accordance with the movement of the focus lens on the basis of the user's operation of the operation unit, the blinking display of the icon and the like is performed in the step S105, and the user operates the shutter at this moment, whereby a focus-adjusted photographing can be performed.

In the above-described process flow, when the distance Df to the face is determined to be in the allowed range Thr_min to Thr_max of focal distances which is calculated from the focal distance Dp, the process proceeds to the step S105, and the distance identification information (face icon) which is displayed additionally on the indicator is displayed blinking, but for example, the in-focus notice may be performed by changing the display color. In addition, the face region identification mark used as a focus frame may be changed in display instead of blinking.

Figure 12:
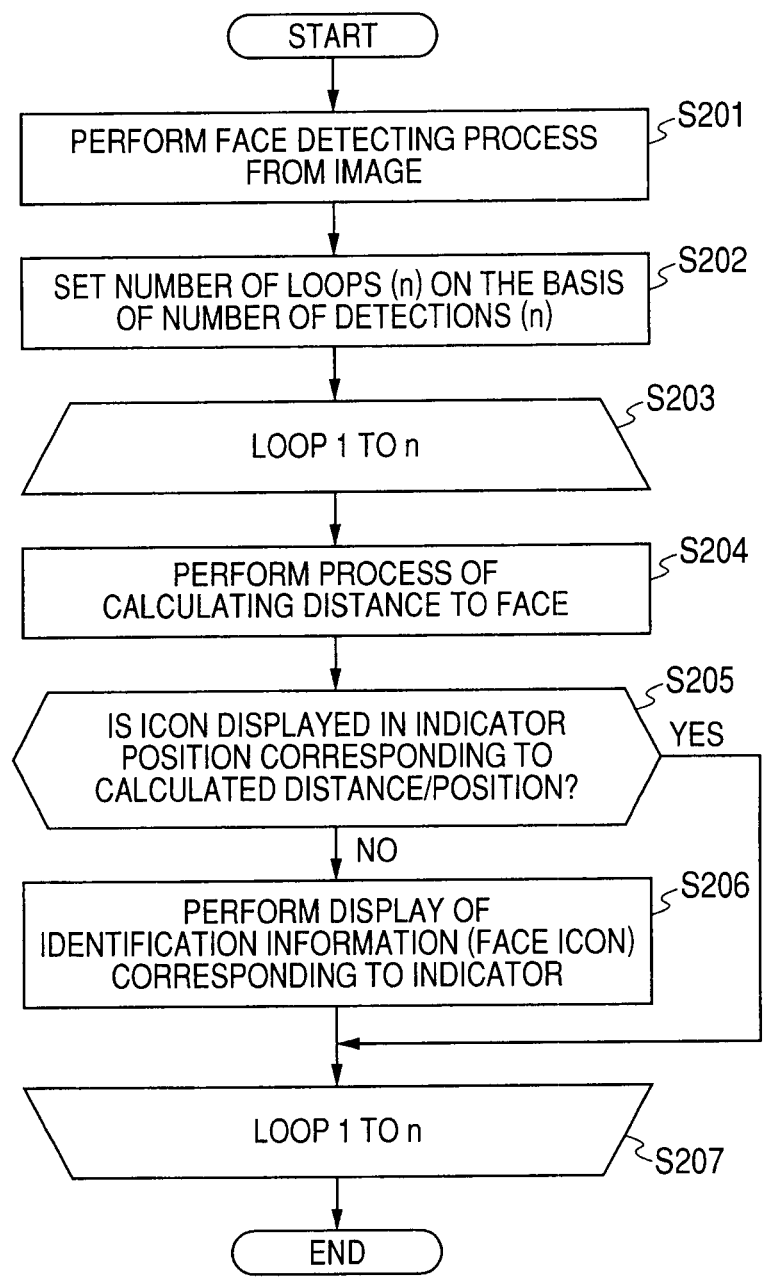
FIG. 12 is flowchart showing the sequence of face detection, distance calculation, and display control on the basis of the calculated distance information in a case where a plurality of faces are detected according to an embodiment of the present invention.

Next, the sequence of processes performed in a case where a plurality of faces are detected by the face detecting unit will be described with reference to a flowchart shown in FIG. 12. The processes shown in the flowchart of FIG. 12 are also performed by controlling constituent units such as the face detecting unit 130 under the control of the control unit 110 of the imaging apparatus shown in FIG. 2. At first, in a step S201, a face region is detected from an acquired image of the imaging apparatus by the face detecting unit 130. As described above, for example, the face region in the acquired image is determined by matching a template in which information on the luminance distribution of the face is recorded with an actual image for the detection. In a step S202, the number n of loops corresponding to the number n of faces detected is set, and the processes in steps S203 to S207 are performed.

In a step S203, the loop is started. In a step S204, the distance to one face detected in the step S202 is calculated. The above-described equation Equation 1.1, that is, $Df=Wref\times(f/Wi)\times(Ww/Wf)$ is applied to a basic equation for the calculation of the distance to the subject.

In the calculation process of the distance, as described above, a face size reference value Wref corresponding to the ethnic group, sex, age, and physique of the person may be used.

In a step S205, it is determined whether an icon is displayed in a position on the indicator corresponding to the position of the calculated distance. When the icon is not displayed in the position, the process proceeds to a step S206, and the distance identification information (face icon) is displayed in a position on the indicator corresponding to the position of the calculated distance. On the other hand, when the icon is determined to be displayed in the position on the indicator corresponding to the position of the calculated distance in the step S205, the process proceeds to a next process of a step S207 without performing the display process of the face icon of the step S206, and the process proceeds to a process for the next loop. The processes in the steps S203 to S207 are performed repeatedly the number of times corresponding to the number of detected faces with the target face to be processed changed one by one, and when the process for all the faces are completed, the process ends.

In performing the loop of the steps S203 to S207, the order of faces to be processed, for example, is set to be a descending order in the detected face size. By this setting, a closely located face is processed preferentially, and a face icon of a closely located person is preferentially displayed on the indicator additionally. As described above, when there are a plurality of faces, the display process of icons for faces having low priority levels is not performed, whereby the displays of the icons are configured not to be overlapped with each other.

When a plurality of persons are photographed as described above, a configuration in which a photographer previously selects a face to which the distance is to be measured on a menu, inputs selection information, and the control unit performs the distance calculation and icon display processes only for the selected face may be used. Moreover, for example, a configuration in which a central area of the photographed image is set to a preferential area and priority levels are sequentially assigned to areas from the central position may be used.

Alternatively, a configuration in which only the largest face or a face positioned the most closely to the center of the image is set as a target face for the distance calculation and the icon display and the process is performed only for the target face may be used. In this case, since the number of detected face becomes one, the number of the face icon on the indicator corresponding thereto becomes one, whereby the photographer can easily recognize the face icon without being confused in the correspondence between faces and face icons.

When the photographer performs a rapid pan tilt, a face displayed and detected in the monitor disappears from the field angle, but in this case, the face icon on the indicator is removed and initialized in accordance with the disappearance of the face. However, in order to prevent an erroneous detection, the removal process of the face icon is performed with a predetermined time delay. After the icon is removed and the initialization is performed, the face detection, distance calculation, and icon display processes are re-performed on the basis of the acquired image.

Figure 13:
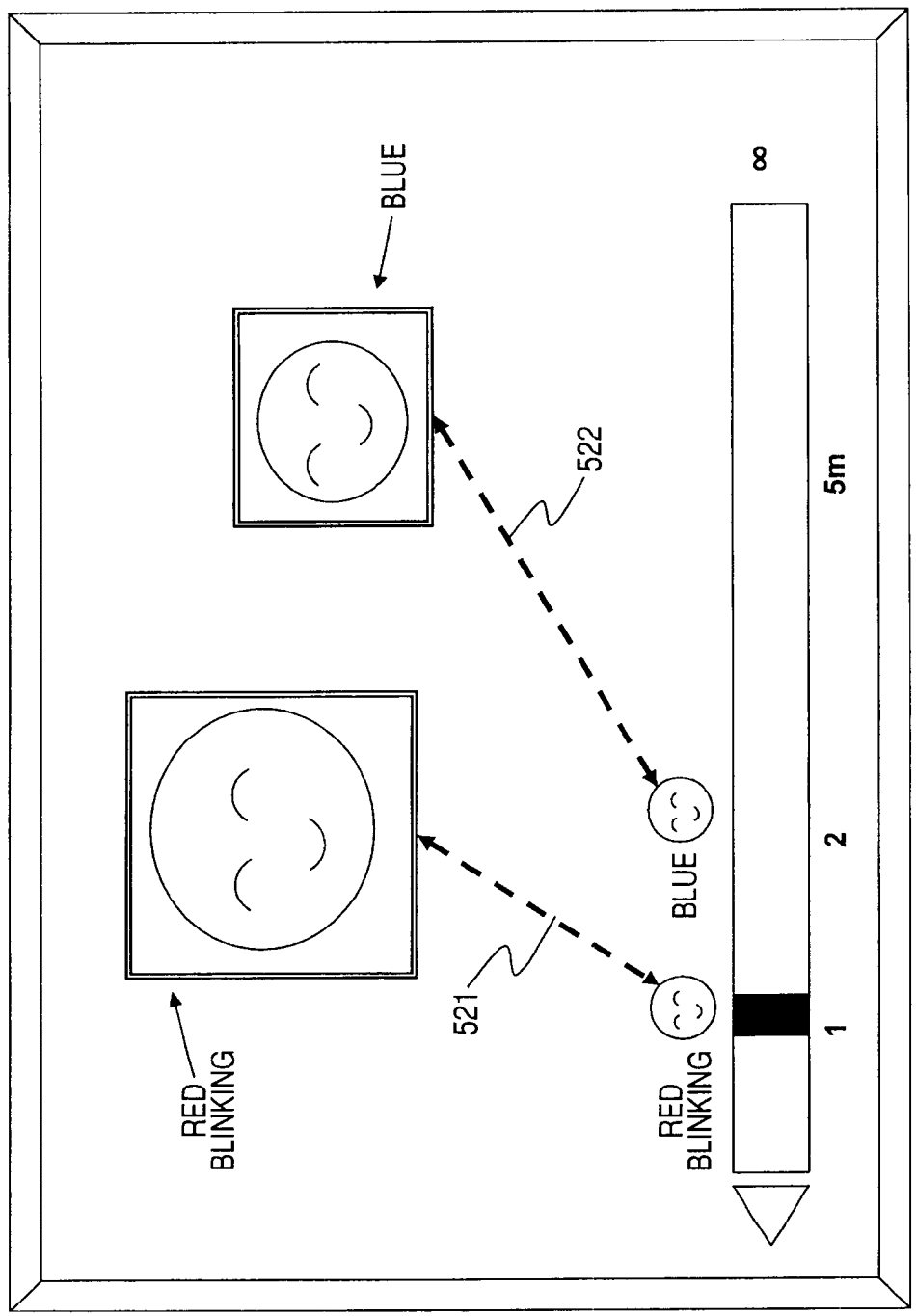
FIG. 13 is a diagram showing an example of data display in an imaging apparatus according to an embodiment of the present invention.
Figure 14:
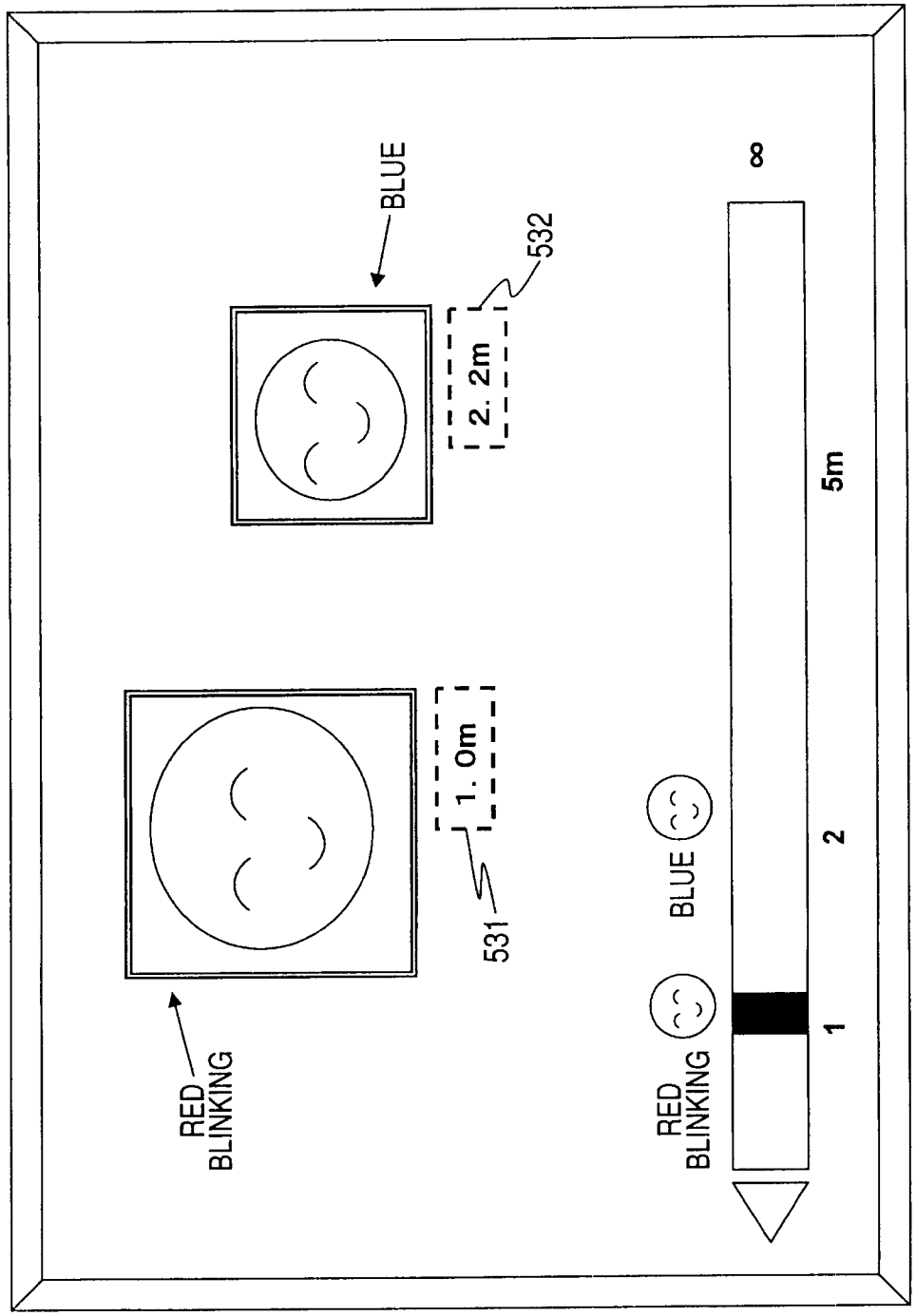
FIG. 14 is a diagram showing an example of data display in an imaging apparatus according to an embodiment of the present invention.
Figure 15:
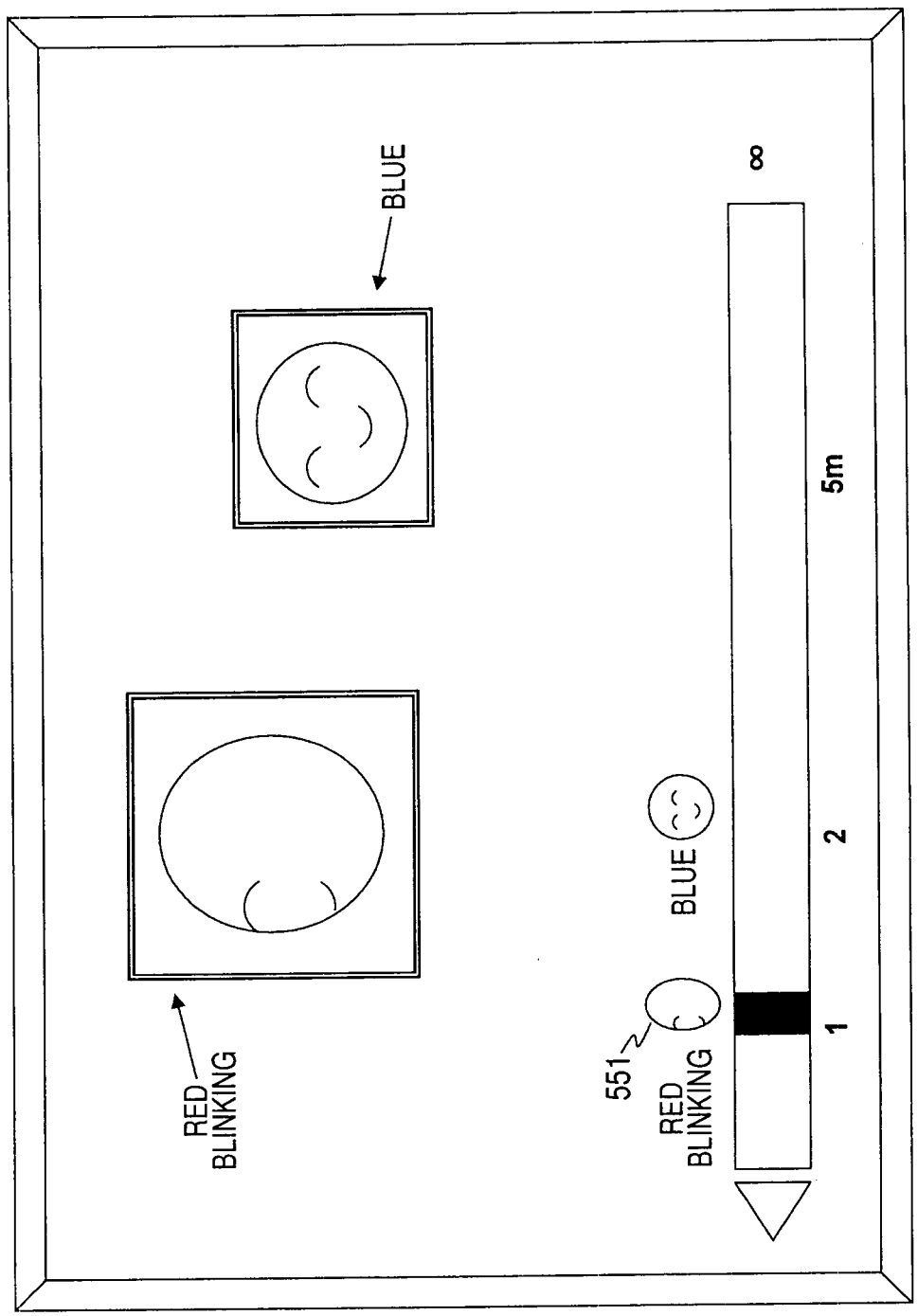
FIG. 15 is a diagram showing an example of data display in an imaging apparatus according to an embodiment of the present invention.

Examples of display of the indicator, the face icon, and the face region identification mark which is used as an focus frame have been described with reference to FIG. 3, but, as shown in FIG. 13, connection lines 521 and 522 that connect face icons and face region identification marks may be displayed, so that the correspondence among a face, a face region identification mark, and a face icon can be easily identified. As shown in FIG. 14, the distance information 531 and 532 may be displayed on the face region identification marks that are used as focus frames. Moreover, as shown in FIG. 15, when a side face between the detected faces turns to the front side, a side face icon 551 corresponding to the side face may be displayed blinking to inform the photographer of the movement. In addition, a configuration in which face icons such as an adult, a child, male, female, and the like are set as the types of face icons, and an icon in accordance with a subject is selected for being displayed on the basis of the detection information of the face detecting unit and the control unit may be used.

The present invention has been described with reference to exemplary embodiments thereof. However, it is apparent that any modification or substitution may be made therein by those of ordinary skill in the art without departing the gist of the present invention. In other words, the present invention is disclosed as an exemplary form, and therefore the exemplary embodiments should not be considered for purposes of limitation. Therefore, in order to determine the gist of the present invention, the appended claims should be considered.

The series of processes described above can be performed by using a configuration of hardware or software or a composite configuration of hardware and software. When the processes are performed by using a software configuration, a program recording a process sequence may be executed by being installed to a memory of a computer installed to a dedicated hardware or may be executed by installing a program to a general-purpose computer capable of performing various processes.

For example, the program may be recorded in a hard disk or a ROM (Read Only Memory) as a recording medium in advance. Alternatively, the program may be stored (recorded) temporarily or permanently in a removable recording medium such as a flexible disc, a CD-ROM (Compact Disc Read Only Memory), an MO (Magneto optical) disc, a DVD (Digital Versatile Disc), a magnetic disk, and a semiconductor memory. The removable recording medium may be provided as so-called package software.

The program may be transmitted from a download site to a computer by using wireless communication or wired communication through a network such as a LAN (Local Area Network) and the Internet, and the computer may receive the transmitted program and installs the program to a recording medium such as an internal hard disk, instead of being installed to the computer from the removable recording medium as described above.

Various processes described above may be performed parallel or independently in accordance with the processing capability of a device for processing or as may be needed as well as performed in time series in accordance with the description. A "system" in the description above is a configuration of a logical combination of a plurality of devices and is not limited to a case where the constituent devices are in one body.

As described above, according to an embodiment of the present invention, a face detecting process and a distance calculating process are performed in an imaging apparatus, and a distance identification information such as a face icon is displayed in a position corresponding to the calculated distance in the distance indicator which is displayed on a monitor screen or a viewfinder. The photographer can intuitively recognize a distance to the person from the display of the distance identification information and also can easily recognize an approximate distance to the person from the face icon displayed in the distance indicator in a focus adjustment process by a manual focus operation, whereby an imaging apparatus capable of performing the manual focus control (focus adjustment) efficiently and precisely is implemented.

According to an embodiment of the invention, a set color for a face region identification mark which is configured to surround a subject image displayed in a monitor or a viewfinder and the color of the distance identification information such as a face icon correspondently displayed in the distance indicator are configured to be identical to each other or a connection line is connected for displaying, and thus it is easy to recognize a distance to a target subject even in a case where a plurality of faces are displayed in the monitor, whereby an imaging apparatus capable of precisely performing a focus adjustment operation on the target subject is implemented.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a face detecting unit to detect a face region from an input image input to the image processing apparatus; and
   a control unit to calculate a distance to a subject on the basis of a face size detected by the face detection unit and to control displaying of a distance indicator including distance identification information indicating the calculated distance and a current focal position indicator in a display unit,
   wherein the control unit performs control processes to display plurality of face region identification marks identifying faces in the image displayed on the display unit and to display the plurality of the face region identification marks and corresponding distance identification information with a graphical indication that the displaying of a face region identification mark is correlated with displaying of the corresponding distance identification information displayed in the position of the distance indicator for each face, and
   the distance indicator displays a distance range and is separate from the plurality of face region identification marks.

2. The image processing apparatus according to claim 1, wherein the control unit performs control processes for displaying a connection line connecting the face region identification mark with the distance identification information displayed in the position on the indicator.

3. The image processing apparatus according to claim 1, wherein the control unit performs control processes of blinking the face region identification mark or changing the display color of the face region identification mark as the display indicating that the face corresponding to the face region identification mark is in the focal position.

4. The image processing apparatus according to claim 1, wherein the control unit performs a display process of the distance identification information in positions in the distance indicator corresponding to distances to each face along with the distance indicator to be displayed in the display unit.

5. The image processing apparatus according to claim 1, wherein the control unit does not display the distance identification information again in a case where the display of the distance identification information in an expected display position of the distance identification information has been already completed.

6. The image processing apparatus according to claim 5, wherein defined priority levels are assigned such that a face region having a larger face size detected by the face detection unit has a higher priority level or that a face region corresponding to a face closer to the center of the image to be analyzed has a higher priority level.

7. The image processing apparatus according to claim 1, wherein a displaying color of a face region identification mark is correlated with a displaying color of the corresponding distance identification information displayed in the position of the distance indicator for each face.

8. The image processing apparatus according to claim 1, wherein the distance identification information includes a face icon displayed on the distance indicator at a position corresponding to the calculated distance.

9. A method of controlling an image processing apparatus which performs an information display process, the method comprising:
   detecting a face region from an input image input to the image processing apparatus using a face detecting unit; and
   calculating, in a control unit, a distance to a subject on the basis of a face size detected by the face detection unit; and
   controlling, in the control unit, a display unit to display distance identification information indicating a distance on a distance indicator and a current focal position indicator, the distance corresponding to the calculated distance,
   wherein the calculation of the distance and display of the identification information further includes performing control processes for displaying a plurality of face region identification marks identifying faces in the image displayed on the display unit and displaying the plurality of face region identification marks and the corresponding distance identification information with a graphical indication that the displaying of a face region identification mark is correlated with the displaying of the corresponding distance identification information displayed in the position of the distance indicator for each face, and
   the distance identification information is displayed as a distance range and is separate from the plurality of face region identification marks.

10. The method according to claim 9, wherein the calculation of the distance and display of the identification information further includes displaying a connection line connecting the face region identification mark with the distance identification information displayed in the position of the indicator.

11. The method according to claim 9, wherein the calculation of the distance and display of the identification information further includes blinking the face region identification mark or changing the display color of the face region identification mark as the display indicating that the face corresponding to the face region identification mark is in the focal position.

12. The method according to claim 9, wherein the calculation of the distance and display of the identification information further includes not displaying the distance identification information again in a case where the display of the distance identification information in an expected display position of the distance identification information has been already completed, by using the control unit.

13. The method according to claim 12, wherein defined priority levels are assigned such that a face region having a larger face size detected has a higher priority level or that a face region corresponding to a face closer to a center of the image to be analyzed has a higher priority level.

* * * * *